N. M. BAKER.
EYEGLASSES.
APPLICATION FILED DEC. 30, 1908.
1,005,133. Patented Oct. 10, 1911.
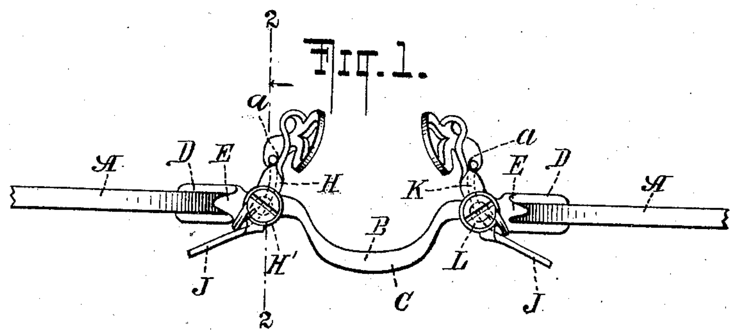
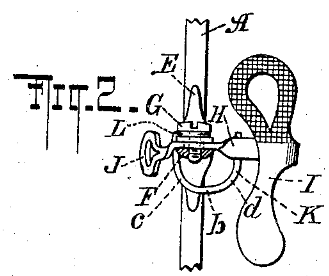
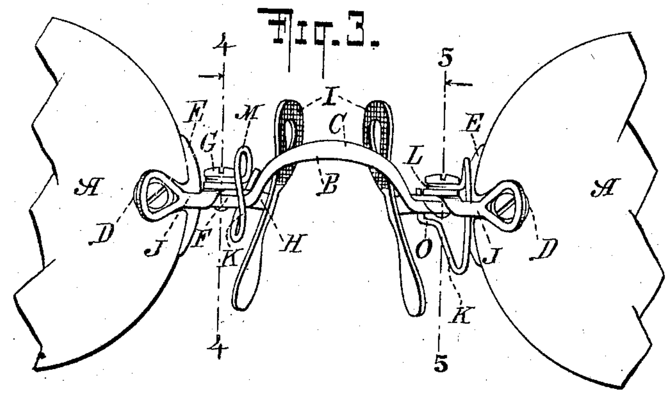
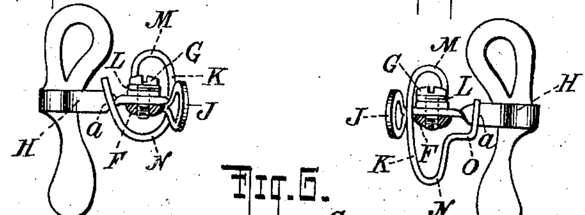
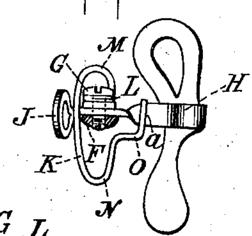
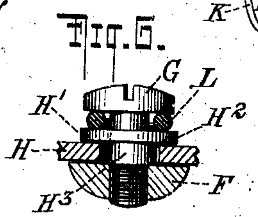
WITNESSES
G. V. Rasmussen
Elmer Shirl young
INVENTOR
NELSON M. BAKER
BY
Briesen & Knauth
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,005,133. Specification of Letters Patent. Patented Oct. 10, 1911.

Application filed December 30, 1908. Serial No. 470,033.

*To all whom it may concern:*

Be it known that I, NELSON M. BAKER, a citizen of the United States, and resident of Southbridge, Worcester county, State of Massachusetts, have invented a new and useful Improvement in Eyeglasses, of which the following is a specification.

My invention relates to eyeglasses of either the rimmed or rimless variety and has more particularly to do with that type of glass in which the lenses are joined by a relatively rigid bridge, while the guards, or portions intended to bear upon the wearer's nose, are pivoted upon the mounting and provided with projecting finger pieces or pads at the rear ends thereof which are adapted to grip the nose through the intermediation of a spring or springs operating upon these guards to bring them toward one another; such guards also are found convenient in practice for manipulation with the fingers when placing the glasses in position.

The object of my invention is to provide a spring controlling these guards which shall be simple to form, easy to place in position, unobtrusive in appearance, inexpensive to construct, and present a good appearance.

A further object is to provide a spring not requiring any exact size of stock, but in which slight tensional differences due to size of stock may be compensated for by corresponding differences in other dimensions of the spring.

A still further advantage of my spring is its adaptability to varyng styles and types of mount.

My invention consists in certain generic constructions of the spring and its mounting, whereby a novel and useful spring action is secured and which provides a powerful but fairly uniform resistance to the movement of the gripping fingers through a considerable angle of spread or opening, while, at the same time, using a minimum amount of stock and requiring only simple and inexpensive operations in the forming and attachment of the spring.

My invention will be best understood by reference to the accompanying drawings in which—

Figure 1 is an enlarged plan view of a pair of eyeglasses fitted with a preferred form of my improvement, the larger portion of each lens being broken away; Fig. 2 is an elevation, part section, taken along the line 2—2 of Fig. 1; Fig. 3 is an enlarged front elevation of a pair of eyeglasses showing each finger piece equipped with another and different form of my invention, while Figs. 4 and 5 are side elevations, partly in section, taken along the lines 4—4 and 5—5, respectively, of Fig. 3. Fig. 6 is a greatly enlarged view of that portion of the mounting at which the levers H are attached and shows a preferred mode of attachment.

Referring to the figures, A, A, are lenses connected together by a structure B comprising a bridge C provided at each extremity with perforated ears D, adapted to include and clamp the edge of the lens between them, and having points or projections E, E, included between the ears and at their base and extending in the plane of the lens on each side of said ears; these points are shaped to the edge curvature of said lenses so as to serve as an abutment therefor and, with the ears, to fixedly support the lens.

Each extremity of the bridge proper just inside the points, E, is flattened above in a plane approximately at right angles to that of the lens so as to constitute a seat F; this seat is threaded for the reception of a screw pivot G, upon which is mounted a tubular washer H′ comprising a shoulder $H^2$ and a shank $H^3$; a lever, H, which constitutes the grip by means of which the glasses are held upon the nose, is perforated to receive this shank and pivots freely upon it. These grips may be of any usual form and are ordinarily provided with pads I, fixed to the rearwardly extending extremities of the levers, and adjusted to lie along the length of the nose and to conform thereto when in gripping position. The forwardly extending extremities of these levers have the form of short arms J, generally bent outwardly approximately in the plane of the levers and so as to have an obtuse angle therewith.

To obtain the necessary gripping effect with the above described levers, springs, coöperating therewith and adapted to press the padded ends thereof inwardly, are generally employed, and it is in the special form and arrangement of said springs that my present invention consists.

Referring to Figs. 1 and 2, which show the preferred form of my invention, the spring K consists of a suitable length of resilient wire having a loop or eye L at one end through which is passed the screw pivot G; this screw being then tightened, the eye L will be clamped and fastened rigidly in place between its head and shoulder $H^2$ of the tubular washer H'. The wire is then formed so as to extend outwardly from the loop sufficiently to clear the mount and lens when it is bent in a generally downwardly direction, inclining gradually and continuously to the rear and then upwardly until the end remote from the loop is sufficiently high to engage the lever arm H at *a*. In placing the spring, an initial tension is given it so that the padded levers are always being pressed inwardly with a certain amount of spring force, the levers being prevented from actually passing inward beyond a certain limit by the angular extensions or arms J which will bring up against the front of the ears D.

The action of the spring is as follows: When the pads are pressed outwardly preparatory to gripping the nose, the inner upwardly extending side of the spring will be pressed against by the lever H, and will bend throughout its length much as it would were this side fixedly attached to the lens mounting at its bottom. Roughly, the spring tension thereby produced, is proportional to the amount or angle of bending given to the spring. In addition to this particular component of tension, however, there is another, torsional, component due to the twist which takes place in substantially the entire downwardly extending portion of the spring lying between the eye L and its lowest point *b*, when the gripping levers are pushed outwardly; this latter component of tensional force also increases approximately in proportion to the angle of twist. Still a third element of tension is supplied by the bending of the bottom portion of the spring K considered as a substantially straight spring, *i. e.* by the bending of substantially that part of the spring lying between the points *c* and *d* of Fig. 2 for example; here, again, the spring resistance is approximately proportional to the angle of bending.

The analysis of the total spring tension and its separation into three components as above made is, of course, not rigidly correct especially as to the limits within which these several components are effective. Thus the angle of twist, in the second component above considered, continuously decreases from the supporting eye L downward, but where said angle actually becomes *nil*, cannot be definitely stated. And as to the other two components, which are both of the order of plain bends rather than twists, it is quite as difficult to say where the exact point of support of the spring length under consideration actually is. But substantially, the several spring actions are as stated.

Carrying the analysis to the limit it is, of course, clear that there is still another resilient component inasmuch as that section of the spring which extends downwardly from the eye L, and which has already been referred to as suffering torsional twist, is also subjected to a certain direct bending as a spring fixed at one end. But the total bending here involved is so small as to be negligible. In the last analysis, therefore, the spring action is seen to be of a two-fold character:—(1) the spring bends as a whole according to the laws pertaining to a resilient rod fixed at one end; and sections of the spring individually and separately bend according to the same laws, these sectional bendings being superposed upon the main bending; and (2) a portion of the spring acts torsionally according to the laws of a rod fixed at one end and subjected to a twist at the other end.

As compared with the type of spring generally used in the class of eyeglass mounts which we have been considering, which springs either bend without twist or twist without bend—I am enabled with my invention to obtain either a much more powerful spring action without increasing the dimensions of the spring or the same spring action with reduced dimensions of the spring. In the latter instance, which will be the one usually chosen, it is obvious that my spring will be more compact and less obtrusive and, since reduced dimensions mean less weight of material, there will be in the case of mounts, made of precious metal such as gold and platinum, a material lessening of cost.

The left hand side of Fig. 3 and Fig. 4 shows a simple modification of my improved spring in which the spring, instead of going directly downward from its eye, L, as in Figs. 1 and 2, is first carried up and then over and down; there is thus an upper loop M in addition to the previous lower loop N. But the elemental spring actions involved, are of exactly the same character as in the form of Fig. 1 and Fig. 2.

In the right hand side of Fig. 3 and in Fig. 4, I have shown still a third form of spring differing only from that of Fig. 4 in the form of the lower half of the spring, in which the loop K has its limbs brought closer together, thus giving room to terminate its free end in a right angle piece O. But here again I have the same elemental spring actions.

While I have described my improved spring as being made from circular sectioned stock, and while I prefer such section, I may, if I desire, choose any other convenient section such as oval, elliptical, square, or otherwise; even a flat strip could be used, although in such case either special methods of forming the spring would be required or else certain initial twists would have to be given the stock in order that the bending forces, as distinguished from the twisting force, might be exerted against the flat of the stock.

While I have shown my spring attached to the lens mount at the tubular washer $H^2$ which also carries the lever or finger piece H, I do not confine myself to such point of attachment, but may select any other convenient place anywhere upon the mount and utilize any other desired mode of attachment.

The exact form of my spring, also, is no essential part of my invention and many varied forms may be found which will embody the two features of torsional and bending characteristics as previously described and more particularly set forth in the following claims:

1. In an eye-glass comprising a pair of lenses held by a relatively rigid mount and provided with a movable finger piece pivoted to each end of said mount, a loop shaped spring having a fixed end at the pivotal point and its other end free but resting resiliently and slidably against an arm of the finger piece, substantially as and for the purpose described.

2. In an eye-glass comprising a pair of lenses held by a relatively rigid mount and provided with a movable finger piece pivoted to each end of said mount, a loop shaped spring having a fixed end at the pivotal point, an adjacent limb on one side of said fixed end and its other end free but resting resiliently and slidably against an arm of the finger piece upon the other side of the said pivotal point, substantially as and for the purpose described.

3. In an eye-glass comprising a pair of lenses held by a relatively rigid mount and provided with a movable finger piece pivoted to each end of said mount, a loop shaped spring having a fixed end at the pivotal point, limbs upon each side of said pivotal point, and an outer end free but resting resiliently and slidably against an arm of the finger piece, substantially as and for the purpose described.

4. In an eye-glass comprising a pair of lenses held by a relatively rigid mount and provided with a movable finger piece pivoted to each end of said mount, a loop shaped spring having a fixed end at the pivotal point, its other end free and resting resiliently and slidably against an arm of the finger piece, and limbs between said two ends but on opposite sides of the pivotal point, substantially as and for the purpose described.

5. In an eyeglass comprising a pair of lenses held by a relatively rigid mount and provided with a movable finger piece pivoted to each end of said mount, a loop-shaped spring arranged across the plane of movement of the finger piec. one end of said spring being clamped at the pivotal point and the other end lying across said finger piece in contact therewith and slidable lengthwise of said finger piece.

In witness whereof I have hereunto set my hand in the presence of two subscribing witnesses.

NELSON M. BAKER.

Witnesses:
E. E. SABIN,
F. G. BLANCHARD.

Copies of this patent may be obtained for five cents each, by addressing the "Commissioner of Patents, Washington, D. C."